United States Patent [19]

Brandsma et al.

[11] 3,761,879

[45] Sept. 25, 1973

[54] BUS TRANSPORT SYSTEM FOR SELECTION INFORMATION AND DATA

[75] Inventors: Johan Rudolf Brandsma; Benny Louisa Angelina Waumans, both of Emmasingel, Eindhoven, Netherlands

[73] Assignee: U.S. Philips Corporation, New York, N.Y.

[22] Filed: May 8, 1972

[21] Appl. No.: 250,990

[30] Foreign Application Priority Data

May 12, 1971 Netherlands .......................... 7106491

[52] U.S. Cl. .............................................. 340/172.5

[51] Int. Cl. ............................ G06f 3/00, G06f 9/18

[58] Field of Search .................................. 340/172.5

[56] References Cited

UNITED STATES PATENTS

| | | | |
|---|---|---|---|
| 3,274,554 | 9/1966 | Hopper | 340/172.5 |
| 3,200,380 | 8/1965 | MacDonald | 340/172.5 |
| 3,274,561 | 9/1966 | Hallman | 340/172.5 |
| 3,419,849 | 12/1968 | Anderson | 340/172.5 |
| 3,544,965 | 12/1970 | Packard | 340/172.5 |
| 3,593,302 | 7/1971 | Saito | 340/172.5 |

*Primary Examiner*—Paul J. Henon
*Assistant Examiner*—Sydney R. Chirlin
*Attorney*—Frank R. Trifari

[57] ABSTRACT

A switching unit and a computer system comprising such a switching unit so as to enable processor to converse with a free storage module of a group of processors and storage modules at substantially any given moment. The switching unit comprises a common selection bus for transporting selection information from a processor to a storage module, and a common input and output bus for transporting data between a processor and a storage module. The switching unit furthermore comprises priority circuits so as to deal with simultaneously received requests for the same bus in a given sequence. According to the invention the switching unit comprises registers for storing selection information and/or data, said registers being connected after and eventually also before the relevant common bus.

3 Claims, 9 Drawing Figures

BUS TRANSPORT SYSTEM FOR SELECTION INFORMATION AND DATA

Figure 1:
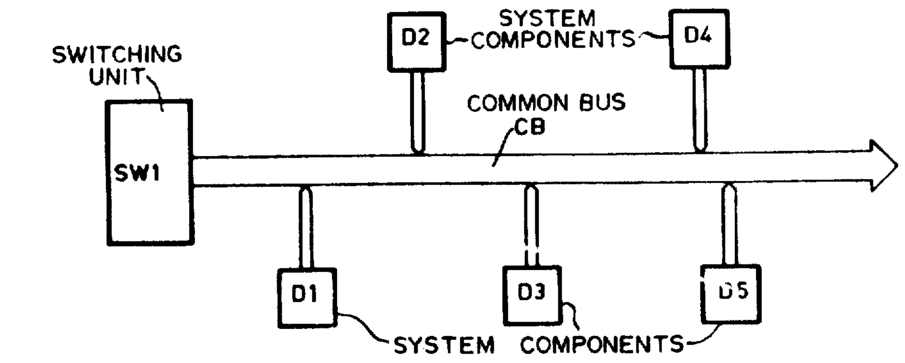

The invention relates to a switching unit for connecting a number of ($n$) processors to a number of ($m$) storage modules, comprising a control unit by means of which each of the processors can be connected to each of the storage modules so that conversation, that is to say transport of information, between any combination of a processor and a storage module is possible at substantially any instant, the switching unit to this end comprising a first priority circuit by means of which, if more than one request is received from a number of processors for connection to a given storage module, the request of the highest priority can be granted, provided that the relevant module is free, the switching unit furthermore comprising at least one selection bus which is common to all storage modules and which serves for transporting selection information to the storage modules, at least one second priority circuit by means of which the request of the highest priority of a number of requests for connection to more than one storage module, originating from said first priority circuit, is granted, the associated selection information then being transported to the relevant storage module via said selection bus, after which the selection bus becomes available again for transporting selection information to another storage module, and at least one input and output bus which is common to all storage modules and which serves for transporting information to be written and read as a result of said selection. Computer systems of this kind in which the various components have the possibility of "conversing" with other components of the system, that is to say having the possibility of exchanging information, are known.

This system thus utilizes a common bus structure. However, a bus (selection bus, input bus, output bus) does not extend through the entire system, but is limited to the switching unit itself. Moreover, this bus structure is in principle sub-divided, i.e., into a selection bus and an input and output bus. Selection information arriving at a storage module via the selection bus will perform a selection in the store, so that as a result information will be transported via the input of the output bus, depending on whether writing or reading is to be effected. In this type of organization the basic aspect is that the buses (selection, input, output bus) are occupied only if a transport is actually being effected. During waiting times for selection in the store itself and during the writing and reading in the store itself, the selection bus, the input and the output bus are available for transports between other combinations of processors and storage modules. However, the result obtained with the described known set-up is not yet optimum. If a transprt is effected, the buses remain occupied until the relevant information has reached its destination. The following applies to the selection bus: the selection information must be transported to a storage module via the bus. During the time required for trnasporting the selection information from the selection bus to the storage module, the selection bus also remains occupied. The same applies to the input and the output bus as regards the transport-time from the input bus to a storage module and from the output bus to a processor, respectively. As the distances between processors and storage modules are becoming ever larger, and since these distances vary greatly per processor and/or storage module in a system, it is particularly important to ensure that said transport times do not deteriorate the efficiency of the system. The occupation of the buses during the required transport times limits the amount of information to be processed per unit of time.

So as to enable unimpeded traffic, a solution is known in the form of a so-termed cross-bar switch, enabling each processor to converse with a free storage module at any given instant. However, to realize such an arrangement, a very substantial amount of material is required as any feasible connection must be completely present.

The invention has for its object to provide a solution for quickly handling the traffic between the processors and the storage modules, in which substantially less hardware is required in comparison with said cross-bar switch, and in which each processor can still converse with a free storage module at substantially any given instant. Moreover, the distance between each of the system components is no longer of importance, and the switching unit can be arranged in the most practical location. To achieve this object, the computer system according to the invention is characterized in that for reducing the occupation time of the common selection bus by the transmission time required for transporting selection information from the selection bus to the storage module, the switching unit comprises registers for storing the selection information which are connected after the said selection bus. It is thus achieved that the occupation of the selection bus is minimum for transporting selection information via this bus. The same can be achieved as regards the transport of information via the input and the output bus. To this end, the switching unit according to the invention is characterized in that for reducing the occupation time of the input and the output bus by the transmission time which is required for the transport of information from the input bus to a storage module and from an output bus to a processor, the switching unit comprises registers for storing the information to be written into the storage modules and to be read from the storage modules, said registers being connected after the said input and output bus. The situation described thus far still has one drawback, i.e., the processors and storage modules are still dependent to some extent of what happens in the switching unit. If a processor supplies selection information and the selection bus is not free, this selection information must remain available in the processor; the selection information can pass only after the selection bus has become free. The same applies to the information to be transported via the input bus and the information to be transported via the output bus. So as to render all components of a system as independent as possible, the invention provides another solution which is characterized in that in order to render the processors and storage modules independent of the switching unit, the switching unit comprises registers for storing selection information which are connected before the selection bus, registers which are connected before the input bus and which serve to store information to be written from the processors into the storage modules, and registers which are connected before the output bus and which serve to store information read from the storage modules and to be transported to the processors.

In practice, the incorporation of said registers in the switching unit may mean that the corresponding registers in the processors and/or the storage moduls can be dispensed with so that this measure does not require additional material.

The invention will be described in detail hereinafter with reference to the figures. Corresponding components are denoted by the same references in these figures.

FIG. 1 is a schematic representation of a known bus system.

Figure 2:
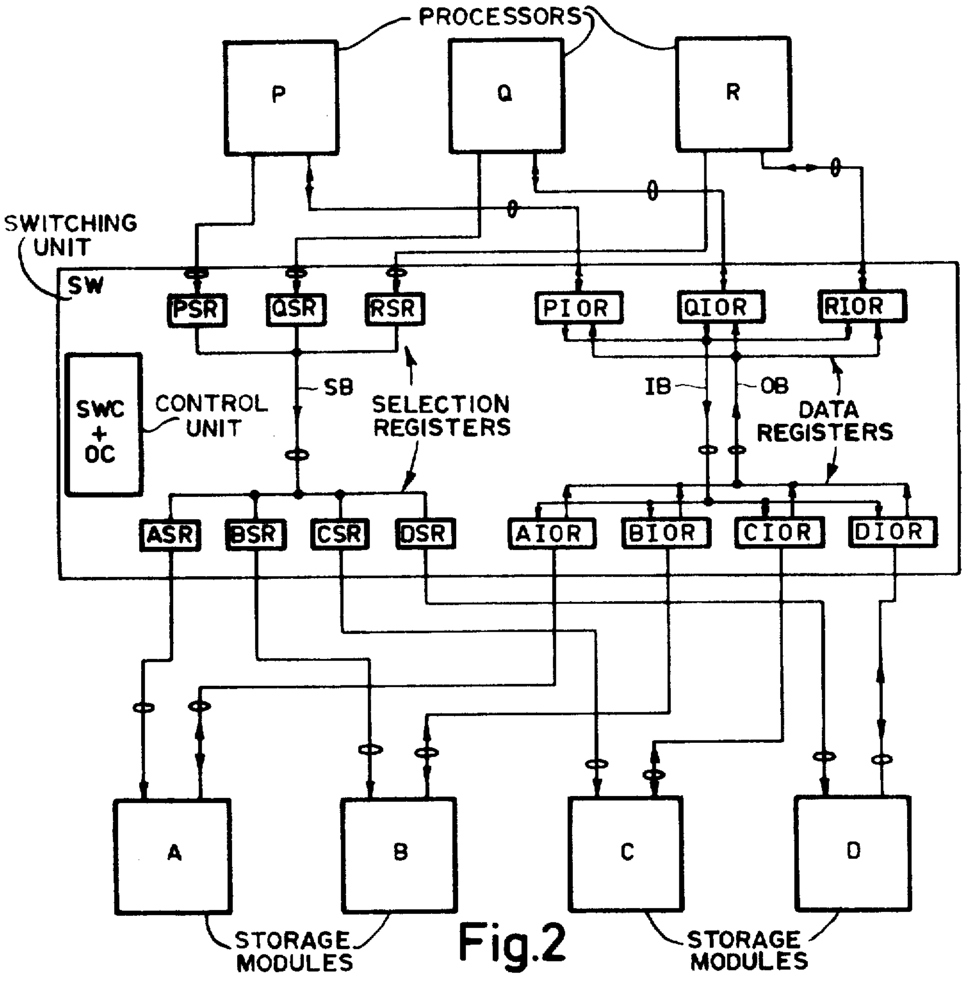
Figure 3:
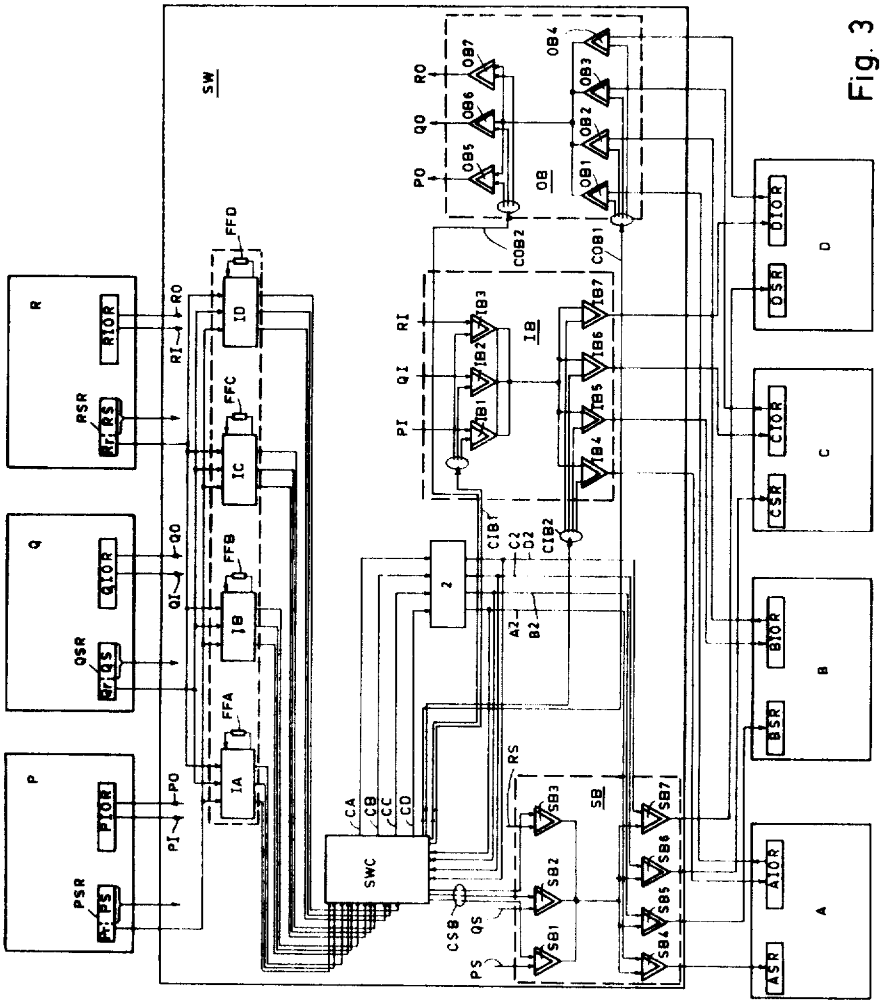
Figure 4A:
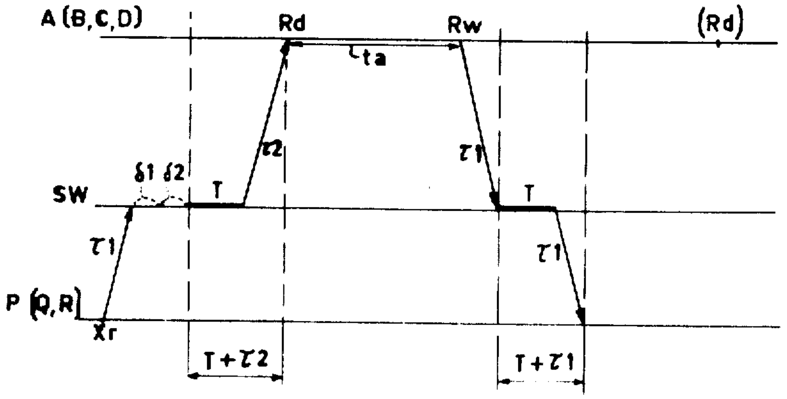
Figure 4B:
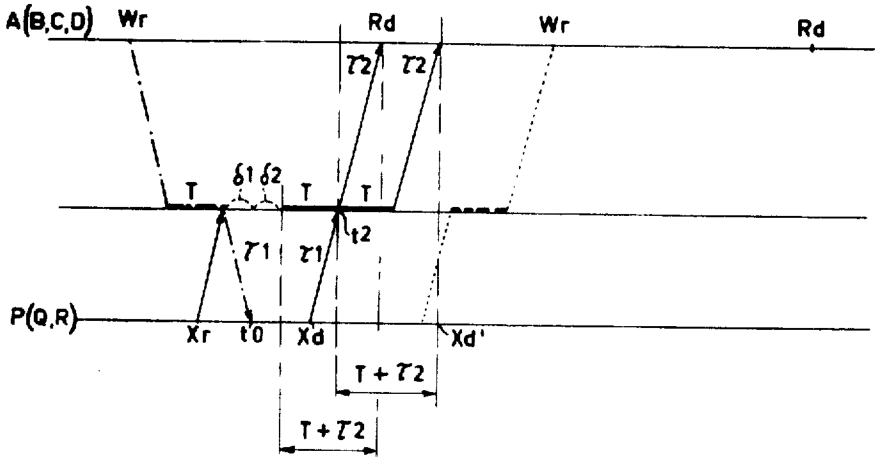
Figure 5A:
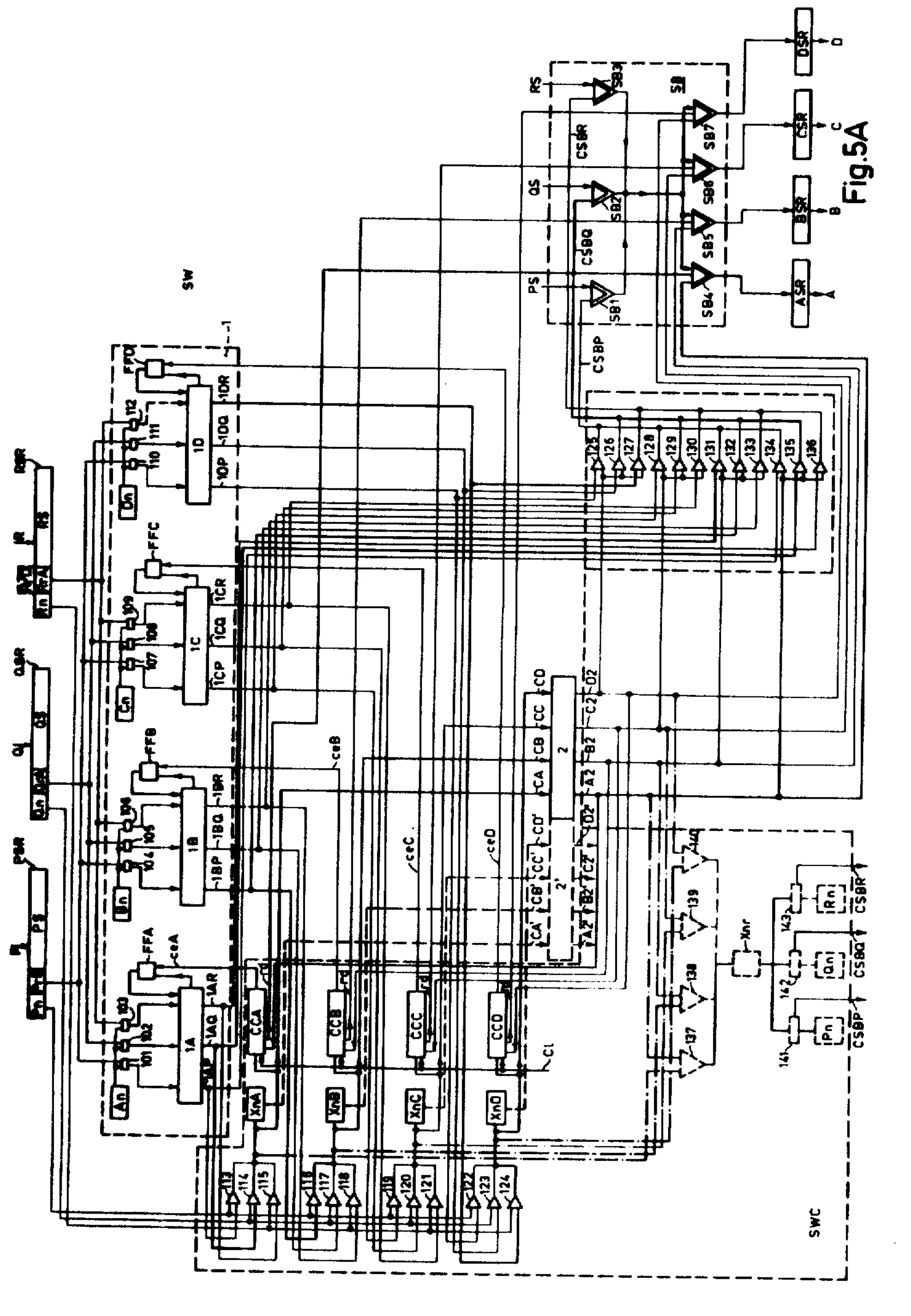
Figure 5B:
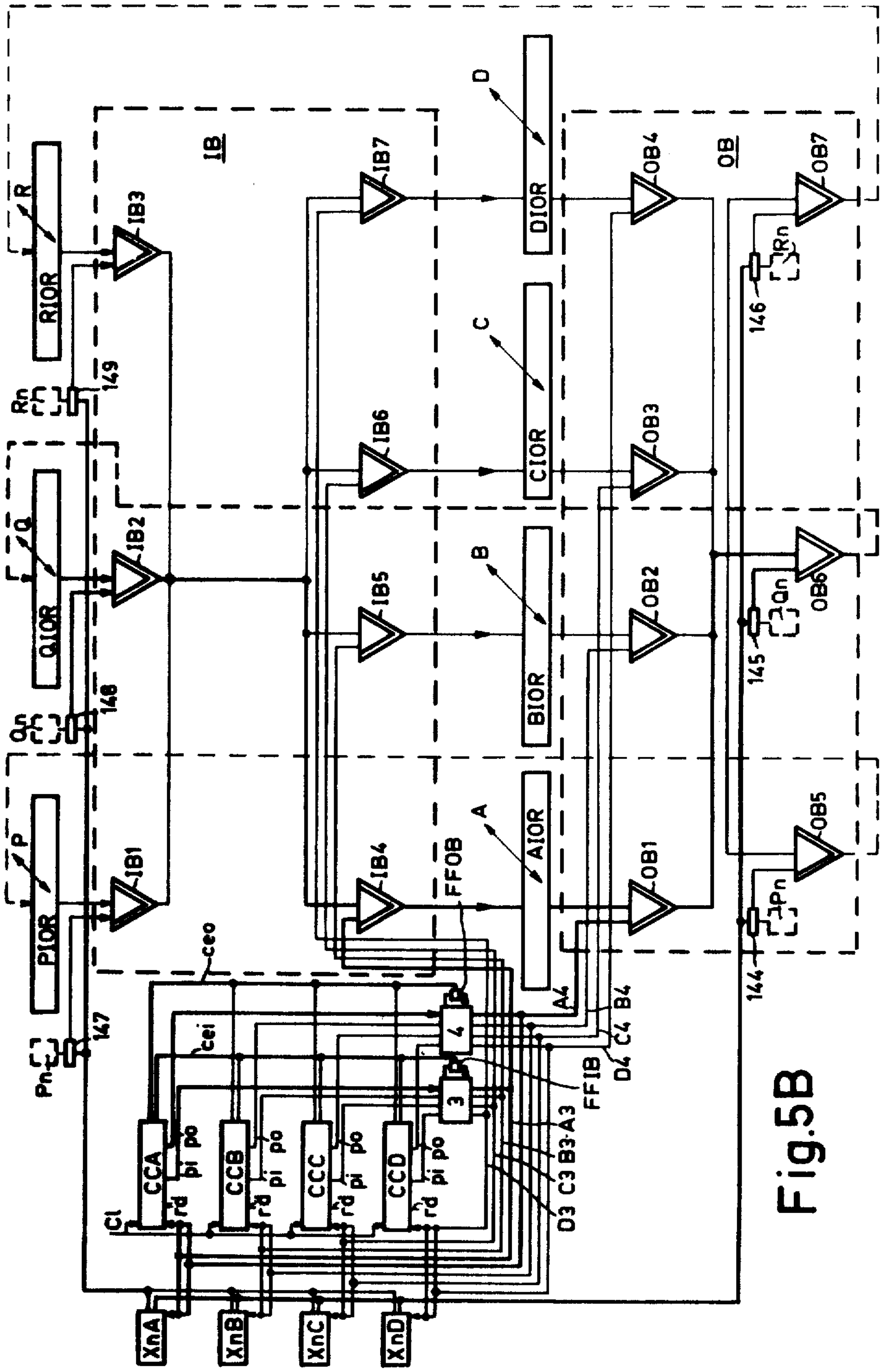
Figures 6A, 6B:
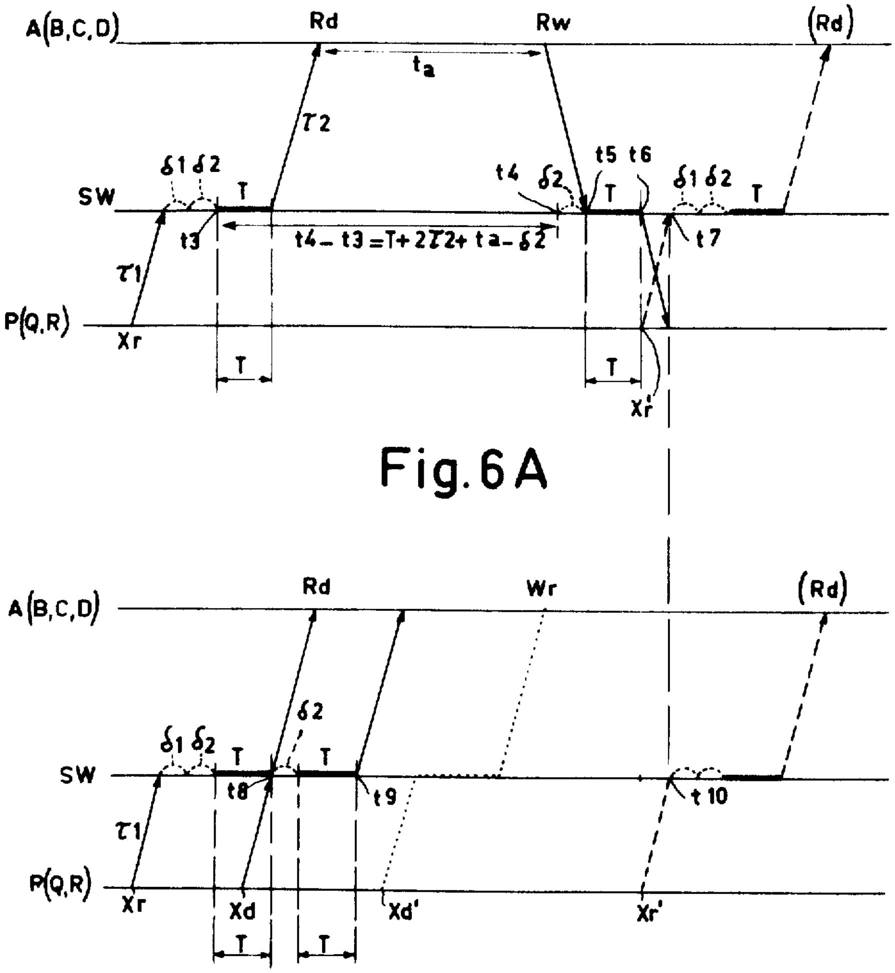

FIG. 2 shows a first schematic representation of a system according to the invention, FIG. 3 shows a more detailed diagram of an example of a system according to a known set-up, FIGS. 4A and 4B show time diagrams for the device shown in FIG. 3, FIGS. 5A and 5B together show a detailed diagram of an example of a switching unit according to the invention, FIGS. 6A and 6B show time diagrams for the device according to the invention shown in FIGS. 5A and 5B.

FIG. 1 shows a computer system comprising a common bus of the kind set forth. The system is composed of a number of components: D1 to D5, which may be processors, stores, peripheral equipment. SW1 denotes a switching unit, SW1 and D1 to D5 are all connected to the common bus CB which extends through the entire system. In particular the components D1 to D5 are "hooked up" to the bus and various other components may also be "hooked up." If a component D*i* in this system wishes a connection with a component D*j*, component Di supplies a relevant request to the switching unit SW1. If more than one request is present, a priority circuit provided in SW1 determines which request will be granted. SW1 furthermore comprises a control unit which ensures that the requests are correctly dealt with. Information from a component Di then travels via the bus CB and is taken up by a component for which a request was made by Di. In this way an information exchange is effected via the bus CB. The information from Di passes all components preceding Di, and is taken up in Dj after having been recognized in Dj as being intended for Dj, and vice versa. During an exchange procedure of this kind, in which, however, information is actually transported only during a minor portion of the time, the bus CB is kept occupied. The times required for selection, writing and reading and the like in a component during which no transport is effected, is thus lost. In a necessarily heavy traffic in such a system, this leads to inadmissible stagnation. The invention thus has for its object to provide a solution without the amount of required hardware becoming prohibitive as would be the case if the solution involving the already mentioned cross-bar switch were selected.

FIG. 2 shows a first set-up of a system according to the invention. FIG. 2 clearly indicates a completely different set-up from the system shown in FIG. 1, because in FIG. 2 a switching unit SW is arranged between a group of in this example three processors P, Q and R on the one side, and a group of, in this case, four storage modules, A, B, C and D on the other side. These numbers can be arbitrarily increased. The arrangement of the switching unit SW depends on the geographical location of the processors and the stores and the traffic therebetween. In this figure the following devices can be distinguished in the switching unit: SWC + OC which is a control unit, and a number of registers which are incorporated in the switching unit SW according to the invention, i.e., selection-information registers PSR, QSR and RSR, one for each processors P, Q and R, and selection-information registers ASR, BSR, CSR and DSR, one for each storage module A, B, C and D. Arranged between the two groups of registers is the common selection bus SB. Also provided according to the invention are input-output data registers PIOR, QIOR and RIOR, and AIOR, BIOR, CIOR and DIOR, respectively. Arranged between the latter groups are the common input bus IB and the common output bus OB. The assembly is controlled from SWC + OC. It is to be noted that, should this be necessary in practice in view of the traffic density, the number of buses can be arbitrarily extended; for example, two selection buses and two input and output buses for a large system comprising many processors and stores.

The operation of the system shown in FIG. 2 will first be described with reference to the system shown in FIG. 3, be it that in the example shown in FIG. 3 the said groups of registers PSR, , . . ASR, . . . PIOR, . . . AIOR, . . . are present in the processors and the storage modules, respectively, instead of in the switching device in accordance with the invention.

In FIGS. 5A and 5B these registers are again incorporated in the switching unit SW according to the invention. It is to be noted that these registers can be incorporated in SW as well as in the processors or the storage modules, respectively.

FIG. 3 shows a slightly more detailed diagram of a device according to a known set-up. Following a description of this set-up, the invention will be readily understood with reference to FIGS. 5A and 5B, The processors P, Q and R comprise the selection-information registers PSR, ASR and RSR, and the input-output data registers PIOR, QIOR and RIOR. The storage modules A, B, C and D comprise the selection-information registers ASR, BSR, CSR and DSR and the input-output data registers AIOR, BIOR, CIOR and DIOR. In this example, the storage modules are of the same kind; they have equally wide data paths and equal cycle times. Due to the fact that, in contrast with the invention, the said groups of registers are not incorporated in the switching unit SW in this example, it is also necessary that the delay times of the information between the processors and the switching device and also the delay times of the information between the storage modules and the switching unit are mutually equal. This may be difficult to realize in practice, but this difficulty is fully eliminated according to the invention as will be described hereinafter.

The switching unit SW comprises the control unit SWC, a first priority circuit 1, comprising the portions 1A, 1B, 1C and 1D and occupation flipflops FFA, FFB, FFC and FFD, a second priority circuit 2, and finally the three common buses SB, IB and OB. The selection bus comprises gate circuits SB1 to SB7. The input bus comprises the gate circuits IB1 to IB7, and the output bus comprises the gate circuits OB1 and to OB7. These gate circuits are enclosed by a double line so as to indicate that they are composd of a large number of AND-function gates, i.e., as many as there are bits in the information paths (number of selection-information and data bits). For selection information, this may amount to, for example, 30 bits (address + control bits); for the data this may be, for example, 144 bits.

The operation is as follows: requests for access to one of these storage modules originate from the processors. To this end, the portion Pr, Qr and Rr of the selection-information registers PSR, QSR and RSR supplies a request signal which contains the number of the requester (the processor) and the number of the requested component (the storage module). These request signals are applied to the priority circuit 1 of SW. On the inputs of portion 1A are collected the requests for connection to storage module A, on those of portion 1B the requests for B, on those of portion 1C the requests for C, and on those of portion 1D the requests for D. Depending on whether or not a relevant module is already occupied at that instant, indicated by an occupied state of the various flipflops FFA, . . . FFD, the request having the highest priority will be granted. This priority may be a fixed priority, for example, processor P has the highest priority, Q has the highest priority but one, etc. The priority may also be cyclical or fully variable, each time to be determined by the processors themselves.

All outputs of the priority-circuit portions 1A, . . . 1D, are connected to the control unit SWC. Per portion 1A, . . . 1D, however, only one output line can be "high." In SWC the number of the requesting processor is stored per module A, . . . D. SWC furthermore comprises one counter per module (see FIG. 5A) by means of which the further course of events is controlled. Signals appear on the outputs CA, CB, CC and CD if requests for the relevant modules are made. These outputs are connected to the inputs of the second priority circuit 1. In this circuit 2 it is determined which module A, . . . D has priority over the other modules so as to grant the request from the processor requesting access to the relevant module. The priority may be determined by the modules: for example, A has the highest priority, etc.; in practice, however, this will be determined by the requesting processor. See the description of the priority diagram of the circuit 1. The result is in any case that one of the outputs of circuit 2 becomes "high." This is passed on to SWC. By means of this "high" signal on one of the lines A2, B2, C2 or D2, it is established in SWC which processor can pass on its selection information. To this end, one of the lines CSB departing from SWC becomes "high," and one of the gate circuits SB1, SB2 or SB3 opens: the selection information PS, QS or RS is transported via the selection bus SB. At the same tine. one of the gate circuits SB4, . . . SB7 is open, i.e., that circuit which is actuated by circuit 2 in view of the "high" state of one of the lines A2, . . . D2, The said selection information PS or QS or RS is thus applied to one of the storage-module selection-information registers ASR, BSR, CSR or DSR. After termination thereof, the selection bus is free again to allow a new transport of selection information. Summarizing, per request for one of the modules the selection bus is occupied only a for the duration of the transport of selection information from the input of one of the gate circuits SB1, SB2, SB3 via one of SB4, . . . SB7 to a storage module. Consequently, the delay time between SW and a storage module is of importance in this respect.

FIGS. 4A and 4B show time diagrams illustrating a read and a write procedure, respectively. The two Figures are identical as regards the selection procedure. The diagrams comprise three levels: the processor level, the switching-unit level and the storage level. A storage request $Xr$ requires $\tau$ 1 time units for travelling from a processor to the switching unit SW. A request is allowed to pass after a decision time $\delta$ 1 in the first priority circuit 1 and a decision time $\delta$ 2 in the second priority circuit 2, which means that selection information is transported via the selection bus, said transport requiring a fixed time $T$. If a request has to wait, a waiting period follows, said period being variable. After that, it takes a period $\tau$ 2 before the selection information reaches the storage module. In this arrangement (no registers in SW) the selection bus is occupied for a period $T+\tau$ 2 per transport of selection information.

The storage cycle starts directly upon reception of selection information (write command Rd). As it is known how long it takes (access time $ta$) before information is read from the store and can be written back again after the instant R$w$, the following takes place in this example: the control unit SWC supplies a signal, via one of the lines COB1, at the instant $t1$ at which information read from a module arrives in the switching unit SW. This signal appears on the line which ensures that either the gate circuit OB1, or OB2, or OB3 or OB4 is opened, depending on from which storage module data are received. The data thus appear on the output bus OB. Via one of the lines COB2, SWC controls one of the gate circuits OB5 or OB6 or OB7, i.e., that gate circuit which provides access to the processor which has requested the data which are now present. Again a fixed bus time $T$ exists, now of the output bus, and a delay time $\tau$ 1 for transporting the data from SW to the relevant processor. In this example, the output bus is thus occupied during $T+\tau$ 1 per data transport. The data read are then applied from the relevant register AIOR, . . . DIOR to the relevant register PIOR, . . . RIOR via the output bus OB. The foregoing means that, as regards the read-out procedure, the selection bus SB is occupied only for a portion $T+\tau$ 2 during one complete cycle of a storage module (FIG. 4A, Rd–(Rd) ). If Rd – (Rd) is, for example, 300 $ns$ and $T+\tau$ 2 = 40=20 = 60 ns, a maximum of five selection-information transports can be effected via the selection bus during one complete store cycle. Consequently, this is dependent of the distances between the storage modules and the switching unit. Via the output bus, for example, 300/ ($T+\tau$ 1 ) = 300/(40+13) = 5 output data transports can also be effected in this case. Consequently, this is dependent of the distances between the switching unit and the processors. The writing of data into a storage module is effected as follows (FIGS. 3 and 4B): the selection procedure is as described above. At a given instant after the selection bus has been allocated to a requesting processor, the control unit SCW in this example ensures that the input bus IB is ready for the data to be written from a relevant processor into a relevant module. This means that one of the lines CIB1 is energized from SWC. Regarding the gate circuits IB1, IB2, IB3, the circuit that opens is always that which is associated with the processor allowed to write into a module at that instant. To this end, IB1 has a connection (data path) with the register PIOR Of processor P: PI input of IB. Similarly, IB2 is connected, via QI, to the register QIOR of Q, and IB3 is connected to RIOR Of processor R via RI. On the other side, SWC opens, via one of the lines CIB2, that one of the gate circuits IB4, . . . IB7 which gives access to the module which will receive data to be written in. To this end, IB4 is connected to AIOR, IB5 to BIOR, etc.

FIG. 4B shows what this means, viewed in time. Assume that the input bus opens at $t2$ and the data are applied to a module via the bus IB; this requires a time T $+ \tau 2$. In this example where the register groups are not incorporated in the switching unit, the data can in principle "depart" from the processor simultaneously with the request signal X*r*, provided there was no preceding reading cycle, so that these data are already present in SW before $t2$ for transmission via IB. If the preceding cycle was a reading cycle, it may be that the information read from a module has not yet arrived in the relevant processor at the instant that the request Xr for a write cycle is already admissible. This means that the information to be written cannot yet be transmitted form a processor. In the example shown in FIG. 4B, this is denoted by a chain-link line: the preceding cycle is a read cycle and the data arrive in an input-output register PIOR, . . . at the instant $t$O. Consequently, information can be transmitted $t$O the switching unit after the instant $to$. However, the departure of the data from a processor can also be effected slightly later. This means that the relevant data in the processor may become available in an input-output register PIOR, . . . at a later instant. In this example, the data depart at the instant X*d* so as to be present on the input of the bus IB at an instant $t2$. FIG. 4B shows that the last instant at which the data can still depart from the processor is determined by $Xd' = Wr - \tau 2 - T - \tau 1$ in order to arrive in the module at *Wr*(see dotted line). In this example, this means that the input bus is occupied for $T + \tau 2$ per transport. Taking into account the already mentioned numbers, $300/(T + \tau 2) = 5$ write transports are thus possible via the input bus per storage cycle.

The foregoing implies that within said storage-cycle time not just four storage modules could be connected as chosen for this example, but five without stagnation being liable to occur. The same applies to the number of processors, which can also be five.

If stagnation is permissible, limited to a given extent, of course, even more processors and/or storage modules can be connected.

The requirements to be satisfied by the storage modules in the embodiment shown in FIG. 2, may give rise to practical problems. So as to avoid these problems, an additional priority circuit can be incorporated in the switching unit SW before the input and the output bus. It is thus achieved that a request can be designated which is to be dealt with directly, while the others have to wait. This is shown in FIGS. 5A and 5B.

According to the invention, by incorporating the said register groups PSR, . . . ASR, . . . PIOR, . . . AIOR, . . . (see FIG. 2) in the switching unit, the pursued additional saving as regards the occupation time of the various buses, as described with reference to FIGS. 4A and 4B, can be achieved and the system components can thus be rendered independent. These points will be described with reference to an embodiment according to the invention which is shown in the FIGS. 5A and 5B, and using time diagrams which are shown in FIGS. 6A and 6B. The same references are used as in FIG. 3. FIG. 5A shows a portion of the switching unit SW and the selection bus, while FIG. 5B shows the same portion as FIG. 5A and also the input and the output bus. FIGS. 5A and 5B show the device with reference to a given situation: processor P requests module B, Q requests A, and R requests A and D, respectively. The heavy lines in this embodiment represent lines which are "high."

In FIG. 5A the selection information registers PSR, QSR and RSR are incorporated in the switching unit SW in accordance the invention. The processors P, Q and R are situated at arbitrary distances. In this embodiment, a portion of the register PSR is reserved for storing the number of the processor from which the selection information originates: P*n*. A fixed information such as P*n*can alternatively be permanently wired.

Also reserved is a location for storing the request signal with its indication of destination, that is to say to which module the request is directed: P*r*B, i.e., processor B requests module B. Also provided are portions Q*n*, R*n*and Q*r*A (requests for A), R*r*A (requests for A and also requests for B: R*r*'D). Each of the request signals B*r*, Q*r*, R*r*is applied to each of the priority-circuit portions 1A, 1B, 1C and 1D of priority circuit 1. For 1A the requests for module A must be collected, for 1B requests for module B, for 1C the requests for module C, and for 1D the requests for module D. To this end, for 1A the module number An is compared with the module numbers of the request signals P*r*, Q*r*and R*r*in comparison units 101, 102 and 103. In 102, agreement is detected between An and Q*r*A, so the output of 102 becomes "high." In 103 agreement is detected between An and RrA, so the output of 103 also becomes "high." Similarly, comparison units 104, 105, 106 are provided for a module number Bn, 107, 108, 109 for Cn, and 110, 111, 112 for Dn. On the basis of the chosen example, the outputs of 104 and 112 are "high." It is to be noted that processors R has supplied a request for module A and, for example, slightly later, a request for module D. It may be that, if the request for A is not granted (such as is the case in this example), there is no waiting in R, but a change-over is made to another microprogramme portion for which a request for module D is required in this example. The occupation flip-flops FFA, FFB and FFC then indicate that requests have been made and that one of the outputs of 1A, 1B and 1D is "high" on the basis of the priority introduced. Consequently, FFC does not supply an occupied signal for 1C. On the basis of the priority, in this case, for example: a request from processor P has priority over a request from Q or R, the outputs denoted by 1AQ, or 1BP or 1DR are "high." All outputs of 1A, 1B, 1C and 1D are applied to the control unit SWC. This also applies to the processor numbers P*n*, Q*n*and R*n*from BSR, QSR and RSR, respectively. In the gate circuits (the number of gates per circuit is only limited, for example, three in the case of eight processors) 113 . . . 124 the following data are combined: in 113 the number P*n*and the signal on the output 1AP, in 114 the number Q*n*and the signal on the output 1AQ, in 115 the number R*n*and the signal on the output 1Ar. Mutatis mutandis, the same applies to the gate circuits 116, 117 and 118, and 119, 120 and 121, and 122, 123 and 124, respectively. The outputs of the described groups of three gate circuits are combined in an OR-function and are connected to the processor-number registers X*n*A, X*n*B, X*n*C and X*n*D, respectively. The processor number of the processor for which it is determined in 1A that it will receive access to module A is thus stored in X*n*A, etc. In the chosen example this means that Q*n*will be stored in X*n*A, Pn in X*n*B, and R*n*in X*n*D. Also connected to the outputs of said groups of three gate circuits are the counters CCA, CCB, CCC and CCD, respectively. These counters are connected to a clock line C1.

When a said group output (for example, of 113, 114, 115) becomes "high," the counter CCA connected thereto is started. At a given instant, counters CCA, CCB, CCD have been started. As long as nothing happens, one or more counters circulate idly. The starting of a counter causes line CA or CB or CD, respectively, to become high. A line CC remains "low" in this example. These lines CA, . . . CD are connected to the inputs of the priority circuit 2. In this priority circuit it is determined, on the basis of a priority criterion, for example, a request for module A has priority over a request for B, etc., which module is granted a request. In this example this is the module A. The output A2 is then "high." FIG. 5A demonstrates, on the basis of a priority diagram 2', that other possibilities also exist. The processor numbers stored in the processor-number registers XnA, . . . are applied to this priority circuit 2' via the lines CA', CB', CC' and CD'. It can be determined on the basis of these numbers to which module a request will be addressed. For example, the line bearing the lowest processing number has the priority. Consequently, in this case the B2' output will become "high." This is because processor P request module B. (The number P*n* is stored in X*n*B). Other possibilities are in the form of: the processor X has the priority over the other processors in accordance with a given state. Furthermore, there may be priority in an alternating mutual sequence, etc., all priorities being subject to known priority methods.

Consequently, hereinafter, output A2 of two is thought to be "high,"

Each of these outputs A2, . . . D2 is connected to the relevant counter CCA, . . . CCD. The output of two which becomes "high" terminates the stand-by state of the relevant counter (in this case counter CCA for A2). The operation of this counter controls what happens further with the storage module A. Now it is known which module will be accessed, the combining of processor and module is to be effected, In this example, processor Q will converse with module A. This combination is effected by means of the AND-function gates 125, . . . 136. The output 1DP of priority-circuit portion 1D and the output D2 of 2 constitute the inputs for AND-function gate 125, the output 1DQ of 1D and the output D2 of two are the inputs for AND-function gate 126, etc., for all outputs of the priority circuits 1 and of 2 for all further gates 127, . . . 136. Two inputs will be "high" for only one of these gates. These are the inputs of gate 135 in this example, (originating from 1AQ and A2). The line CSBQ thus becomes "high" The other control lines CSBP and CSBR remain "low." These lines CSB (P, Q, R), serve for controlling the selection bus SB and are hence connected to the gate circuits SB1, SB2 and SB3, respectively. SB2 opens (CSBQ is "high") and allows the selection information present in the register portion QS of register QSR to pass to the other side of the selection bus SP, i.e., to the gate circuits SB4, . . . SB7. Of the latter gate circuits only the gate circuit SB4 is prepared for allowing this selection information to pass, i.e., due to the "high" state of the output A2 of 2. SB5, SB6 and SB7 are connected to the "low" outputs B2, C2 and D2 of 2, respectively. The counter CCA, no longer in the stand-by state, indicates, by means of a pulse on the output rd, the correct instant for transferring the selection information by the relevant prepared gate circuit SB4 to the relevant selection-information register ASR, which is connected to the outputs of the selection bus SB together with the other registers BSR, CSR and DSR. After that, the selection bus is free again because the further transport of the selection information from ASR to module A can then be independently effected. This takes place together with the said pulse on the output *rd* of counter CCA which serves as the start (read) pulse for the storage module A. Due to the advancing of the counter CCA, the output connected to input CA of the priority circuit 2 becomes "low." This means that now the path is free for a next request. For example, now a request for storage module B can be granted: B2 becomes high, the stand-by state of counter CCB is terminated, etc. Consequently, during the transport of selection information from register ASR to module A, selection information for another storage module can already travel via the selection bus.

This is illustrated in time in FIGS. 6A and 6B. As regards the selection, the FIGS. 6A and 6B correspond to FIGS. 4A and 4B. However, a basic difference is that the occupation of the selection bus SB is not $T + \tau 2$, but only a time $T$. This time $T$ is determined by one so-termed register time: the time during which the selection information travels from one of the registers PSR, . . . QSR via the bus, to one of the registers ASR, . . . DSR, including the gate-switching time of the gate circuits SB1, . . . SB3 and SB4, . . . SB7 which may be the input gates of the registers in practice. Such a register time $T$ may be, for example, 37.5 ns. If the duration of one complete storage cycle is 300 ns, (300/37.5 = 8 selection information transports can be effected in one storage cycle, using such a selection bus according to the invention.

It is to be noted that instead of the AND-function gates 125 to 126, the said combination of processor and storage module can also be effected in a different manner. Use can also be made of the processor numbers stored in the registers X*n*A, . . . X*n*D, in combination with the outputs of priority circuit 2. See the chain-link line in FIG. 5A. The processor numbers are applied to gate circuits (same kind as 113 to 124) 137, 138, 139 and 140. Only the gate circuit receiving a "high" output of priority circuit 2 as its input signal opens, so in this case the gate circuit 137 which is connected to the "high" A2. In this case the processor number Qn is stored in an intermediate register Xnr. In comparison circuits 141, 142 and 143, this number is compared with the processor numbers Pn, Qn and Rn which are stored in the registers PSR, QSR and RSR, respectively. In the case of agreemnet, in this case in 142, the line CSBQ becomes "high." The other two registers, CSBP and CSBR, remain low. See further above, where the lines CSB (P, Q, R) arrive in the selection bus SB.

For the description of the further procedure, reference is made to FIG. 5B. This Figure again shows the processor-number registers XnA, . . . XnD, and the counters CCA, . . . CCD. Also shown are the input bus IB and the output bus OB, together with the registers PIOR, . . . RIOR and AIOR, . . . DIOR, which are incorporated in the switching unit in this example. This figure also shows a priority circuit 3 for the input bus IB, and a priority circuit 4 for the output bus OB. Also shown are flipflops FFIB and FFOB which indicate whether or not the circuits 3 and 4, respectively, are free. These circuits 3 and 4 are provided so as to ensure that the information transports between the various processors and storage modules via the buses IB and OB need not be effected within narrow time limits. If these circuits are not provided, there may never be a situation where more than one transport is to be effected via one of the buses at any given instant. A priority circuit of this kind per bus is advantageous for increasing the efficiency of the buses, thus enabling a plurality of different transports to be effected per unit of time, particularly in the case where storage modules having different access times and/or different widths of the data path are involved so that for given modules, for example, a plurality of successive transports is required per word to be transported, or if large differences exist in the distances between the switching unit and the processors and/or the modules. In this case waiting times may arise for the input and the output bus, which will be small in practice if a computer system is properly organized and if a suitable choice is made for the priority criterion, which should preferably be of the same kind as for the previously mentioned priority circuit 1 which is associated with the selection bus.

The operation will be described with reference to this FIG. 5B and FIGS. 5A, 6A and 6B. First, a read procedure will be described (FIG. 5B and FIG. 6A). The example of FIG. 5A (processor Q request module A) will be continued: the counter CCA has supplied the pulse to output rd (see also FIG. 5A), and the selection bus time T (t3) is thus started. The counter advances a number of steps, supplied by clock pulses of the clock input C1, corresponding to the $t4 - t3$. This time is a fixed time per storage module in a given configuration and is represented by a given counter position. This time is determined by the sum of the following times: $T + \tau 2 +$ access time $+ \tau 2 - \delta 2$. Consequently, by the time $T$ which is required for the selection information travelling on the selection bus and the time which is required for travelling between the switching unit and the relevant storage module ( $\tau$ 2), and furthermore the time which is then required in the storage module for making an access ($ta$) and the time $\tau$ 2 which the selected information subsequently requires for arriving in the switching unit, less the decision time $\delta$ 2 of the priority circuit 4. When this time $t4 - t3$ has been counted down, the output *po* of the relevant counter, in this case CCA, supplies a request signal to the priority circuit 4. This means that at the instant $t5$ at which the selected information, read from the store A, arrives in the input-output register AIOR of the switching unit, the output pulse OB can already process this information immediately. This holds good only if the bus OB waf free, i.e., if the relevant request was granted by the priority circuit 4. If this is not so because the bus is occupied, the relevant counter changes over to the stand-by state and the counter does not continue counting. Assume t at according to the present example the request from CCA on circuit 4 is granted for the bus OB. The output A4 then becomes high, the other outputs B4, C4 and D4 remaining "low." The relevant counter CCA thus receives a command to count further. At the same time, the contents Q*n*of processor-number registers X*n*A is applied to the comparison units 144, 145 and 146. The output A4 of four ensures that the gate circuit OB1 opens and that the information which has in the meantime arrived in register AIOR of module A travels via the output bus OB. In the circuit 145 of the comparison circuits 144, 145, 146, agreement is found with the contents Qn of XnA, so that gate circuit OB6 opens. The information thus arrives in register QIOR, from where it can advance to processor Q. The request has thus been dealt with as regards, the processor Q. The output bus is occupied during the bus time $T$. This again amounts to one register time, so, for example, 37.5 ns. In the case of a storage cycle time of 300 ns, it is thus possible to perform 8 output bus transports per storage cycle.

When the information has been transported via the output bus, the counter, in this case CCA, reaches a position which corresponds to the instant $t6$. At this instant the circuit 4 is released again by the resetting of the flipflop FFOB via the line ceo. The counter CCA then advance further until the final position is reached. This is at the instant $t7$. This instant $t7$is determined by the end of the cycle time of the relevant storage module, so in this case A. MOreover, in view of time ( $\delta$ 1 + $\delta$2 + $T$) which is required in the switching unit and the transport time $\tau$ 2 which is required for the transport between the switching unit and the module, this instant $t7$is situated at a time distance $\delta$ 1 +$\delta$ 2 +$T$ + $\tau$ 2 before the instant (*Rd*), which is the instant at which the module can start a new cycle (see broken line in FIG. 6A). This means that a next request for this module can already be effected at an instant X*r'*. The fact that a counter CC(A, B, C, D) reaches its final position also means that the relevant priority circuit portion 1A, 1B, 1C, 1D, respectively, is released again. This is indicated in FIG. 5*a* by the lines *ce*A, *ce*B, *ce*C and *ce*D, respectively. The relevant module, in this case A, thus becomes freely accessible again at the instant $t7$for a next request.

An approximately corresponding procedure takes place when information is written into a storage module. Control information from a processor then sets the counter CC(A, B, C, D), intended for a write request to a given module, to the so-termed write mode. In the example where processor Q will write in module A, it is ensured, for example, simultaneously with the insertion of the processor number Q in the register X*n*A, that the counter is set to the write mode. This means only that now the output *pi* can carry signals instead of *po*. As regards the selection (FIG. 5A) the writing procedure is identical to that for reading information from a module. See also FIG. 6D. For the further writing procedure it is a definite fact that the information to be written may not arrive in the storage module before the selection information. Consequently, the instant for making a request to the input bus IB, i.e. by means of a pulse on an output *pi* of one of the counters CC(A, . . . ), must be selected such that this situation cannot arise. A request on the input bus requires at least a decision time $\delta$ 2 i.e., the decision time of the priority circuit 3 which serves to grant a request on the input bus and which utilizes, for example, the same priority criterion as 2 and 4. If the request is not immediately granted by circuit 3, the relevant counter CC(A . . . ) is switched over to the stand-by state. The data can be transported to the switching unit shortly after the selection, for example, at instant X*d* (but no later than X*d'*, compare FIG. 4B). The counter comprises a given position which corresponds to the instant at which the information arrives in the switching unit in the given configuration, which in this case is the instant $t8$ (which happens to coincide with the end of the selection bus time $t$). At this instant $t8$ the counter, in this case CCA, applies a request pulse to the output *pi* which is applied to the input bus priority circuit 3. Assume that there is no waiting period so that the counter CCA continues because output A3 of three is "high" and because the latter is connected to a control input of the counter. In FIG. 5B, this is the same input of the counter CCA to which output A4 of 4 is also connected. (However, the counter now operates in the write mode instead of in the read mode.) Similarly, output B3 is connected to CCB, C3 is connected to CCC and D3 is connected to CCD. These outputs are also connected to the processor-number registers XnA, . . . X*n*D, respectively. Due to the "high" state of A3, the number of P*n*which is stored in X*n*A is compared in comparison units 147, 148 and 149 with the processing numbers which are stored in PSR, QSR and RSR, respectively. Agreement is detected in 148. 147, 148, 149 are connected to the gate circuits IB1, IB2 and IB3, respectively, of the input bus IB. On the basis of the number agreement found in 148 the gate circuit IB2 will open so as to pass the information present in the register QIOR at this instant to the gate circuits IB4, . . . IB7 of the input bus. Of these circuits, only the circuit IB4 is open as it is connected to the "high" output A3 of circuit 3. The other gate circuits (IB5, . . . IB7) are connected to the "low" outputs B3, C3 and D3, respectively.

After expiration of the input bus time *T*, the information thus arrives in the register AIOR at instant *t*9(see FIG. 6B), from where this information is transported to the module A. In this way, also the input bus IB Is occupied only for the time *T* per information transport. If the duration of *T* is again assumed to be 37.5 ns and that of a storage cycle 300 ns, eight transports can be performed via the input bus in one cycle. Using this number configuration and this switching device, eight processors and eight storage modules could be incorporated in the computer system without giving rise to any substantial stagnation.

When the information has been transported via the input bus, the counter CCA reaches (instant t9) an intermediate final position for the write mode. This can be recognized on the output cei of CCA, and on the output cei of CCB, etc., for the other modules. These outputs are connected to the flipflop FFIB so as to reset this flipflop when one of these outputs becomes "high," thus releasing the priority circuit 3 again. The counter continues as far as is necessary to reach the instant *t*10at which the relevant storage module becomes available again for a next relevant request received in the switching unit. AT this instant the relevant priority circuit portion 1A or 1B or 1C or 1D is also released again. This instant *t*10 corresponds to the instant *t*7 of FIG. 6A in the read mode, as the storage cycle itself is the same. This means that the already mentioned outputs *ce*A, *ce*B, *ce*C, *ce*D of the counters CCA, . . . can be used for releasing, as is indicated in FIG. 5A.

We claim:

1. A switching unit for an information transport system for connecting a plurality of processors to a plurality of storage modules wherein information is transported between any processor and a storage module at substantially any instant, said switching unit comprising:

A. a first priority circuit disposed between said processors and modules for granting the highest priority to one request of a plurality of requests received from said processors for connection to a given module provided that said given module is free;

B. at least one selection bus connected to all of said storage modules for transporting selection information to said storage modules;

C. at least one priority circuit disposed between the first priority circuit and said storage modules via said selection bus for determining which module has priority over the other modules when a request for access to a given module is granted by said first priority circuit, the selection information then being transported through said selection bus to said given storage module, after which the selection bus becomes available again for the transport of selection information to another module;

D. at least one input bus and one output bus connected between said modules and said processors for transmitting information to be written and read as a consequence of said selection;

E. a pair of priority circuits, one connected between the input bus and the processors, and the other between the output bus and the processors, for ensuring that ingress and egress of information to and from the modules is performed in accordance with a priority criterion; and F. registers disposed within the switching unit between the selection bus and said modules for reducing the occupation time of the selection bus by the time required to transport selection information from the selection bus to a storage module.

2. A switching unit as claimed in claim 1, wherein reduction of the occupation time of the input and output bus by the transmission time which is required for transporting information from the input bus to a storage module and from the output bus to a processor, is effected by the switching unit which comprises registers for storing information to be written into, and read from, the storage modules, said registers being connected after the said respective input and output bus.

3. A switching unit as claimed in claim 1, wherein in order to render the processors and storage modules independent of the switching unit, the switching unit comprises registers, connected after the selection bus, for storing selection information, and registers connected before the input bus, for storing information from the processors to be written into the storage modules, and registers connected after the output bus, for storing information read from the storage modules and to be transported to the processors.

* * * * *